(12) United States Patent
Williamson, Jr.

(10) Patent No.: US 7,490,697 B1
(45) Date of Patent: Feb. 17, 2009

(54) PORTABLE ACOUSTIC DIFFUSER FOR PORTABLE GENERATORS

(76) Inventor: Clifford Williamson, Jr., 88 Brock Hill Rd., Grafon, NH (US) 03240

( * ) Notice: Subject to any disclaimer, the term of this patent is extended or adjusted under 35 U.S.C. 154(b) by 367 days.

(21) Appl. No.: 11/445,104

(22) Filed: Jun. 2, 2006

(51) Int. Cl.
*G10K 11/04* (2006.01)
*G10K 11/00* (2006.01)
*H02K 5/24* (2006.01)

(52) U.S. Cl. ............ 181/200; 181/202; 181/204; 181/205; 62/296

(58) Field of Classification Search ........ 181/200, 181/202, 205; 62/296
See application file for complete search history.

(56) References Cited

U.S. PATENT DOCUMENTS

| | | | |
|---|---|---|---|
| 3,789,954 A | 2/1974 | Raleigh | |
| 3,929,207 A | 12/1975 | Urban | |
| 3,951,228 A | 4/1976 | Schnell | |
| 4,258,821 A * | 3/1981 | Wendt et al. | 181/202 |
| 4,493,390 A * | 1/1985 | Pagano et al. | 181/204 |
| 5,274,200 A * | 12/1993 | Das et al. | 181/202 |
| 5,965,851 A * | 10/1999 | Herreman et al. | 181/200 |
| 6,145,616 A | 11/2000 | Ewanek | |
| 6,244,377 B1 | 6/2001 | Iwanami | |
| 2002/0000342 A1 | 1/2002 | Yamada et al. | |
| 2005/0056481 A1* | 3/2005 | Mafi et al. | 181/202 |
| 2008/0099275 A1* | 5/2008 | Seel | 181/202 |

* cited by examiner

*Primary Examiner*—Walter Benson
*Assistant Examiner*—Christina Russell

(57) ABSTRACT

A portable casing includes a body that has first, second, third and fourth sidewalls defining a cavity therebetween. The body has open top and bottom surfaces spanning along a cross-section thereof. The body has an outer layer formed from foam material and an inner layer that has an egg-crate shape and is statically abutted to the outer layer. The inner layer is formed from fire-retardant material. A lid is removably attached to the body top surface. A water impermeable outer canvas is formed from flexible material for being gathered and stretched along the sidewalls. A mechanism is included for ventilating heat emitted by the generator. Stakes are passed through the lid and the bottom surface of the body, anchoring the body to the ground. Tie-down straps are connected to the stakes, assisting a user to remove the stakes from the body.

15 Claims, 4 Drawing Sheets

US 7,490,697 B1

PORTABLE ACOUSTIC DIFFUSER FOR PORTABLE GENERATORS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to acoustic diffusers and, more particularly, to a portable acoustic diffuser for portable generators for muffling sound waves emulated by a portable generator employed during outdoor camping.

2. Prior Art

It is well known that portable generators can be used in various applications. Typically, such generators are employed for providing an operating power source where are a constant source of electrical power is not readily available. One instance where this is true is during camping expeditions, especially when using recreational vehicles (RV's), where the users may need to power certain appliances included with the RV at remote locations.

Although the portable generator is well suited for this use it does exhibit one significant drawback when used in such a situation. Seeing that the generator is a machine in itself, it produces a significant amount of mechanical noise during operating conditions. This can become rather inconvenient during the night when the campers are attempting to sleep, especially since the generator is usually employed in close proximity to the RV or the general camping site. Furthermore, at camp sites where RV's make up a majority of the camp site occupants, the combined noise of a plurality of portable generators can become almost unbearable. It is obviously desirable to provide a means by which the noise created by a portable generator can be reduced or completely silenced.

Noise reduction enclosures are known in the prior art. One prior art example shows a noise reduction enclosure for enclosing a sound-producing machine that includes interconnected upstanding side walls and a ceiling at the upper ends of the side walls. The side walls and ceiling are constructed of beams and support members that have sheet metal panels floatingly mounted thereon. Resilient sealing members are mounted on the periphery of the sheet metal panels to isolate the panels from the beams and support members and to prevent noise leaks. Although this assembly is effective in reducing noise the heavy construction thereof does not make is suitable for use with a portable machine like a generator.

A further prior art example introduces a machinery sound absorbing apparatus that includes a machine which generates a machinery sound, and a sound absorbing unit provided above the machine to have a convex shape in an upward direction. The present example effectively uses sound reflection to prevent copious amount of noise to escape from the enclosure. Unfortunately, the specific angle requirements for such sound deflection necessitate the use of expensive machinery in order to properly produce the enclosure. Also, the present example can not be readily adapted to a more compact and easier to unit, thus making the transport thereof rather difficult and inconvenient.

Accordingly, a need remains for a portable acoustic diffuser for portable generators in order to overcome the above-noted shortcomings. The present invention satisfies such a need by providing an acoustic diffuser that is convenient and easy to use, is versatile in its applications, and effectively reduces the audible noise emitted by a portable generator. Such a portable acoustic diffuser is constructed in a matter of minutes and only requires the use of a hammer or any other suitable striking implement that may be at hand. The diffuser can be stored in a relatively small volume of space when not in use. Such a portable acoustic diffuser is also adaptable for use with a wide range of portable generators. The diffuser greatly reduces the noise levels generated by the generators, thereby advantageously preventing the disturbance of those within the vicinity of the generator.

BRIEF SUMMARY OF THE INVENTION

In view of the foregoing background, it is therefore an object of the present invention to provide a portable acoustic diffuser for portable generators. These and other objects, features, and advantages of the invention are provided by a portable casing for muffling sound waves emulated by a portable generator employed during outdoor camping.

The portable casing includes a body that has monolithically formed first, second, third and fourth sidewalls defining a cavity therebetween. Such a body further has open top and bottom surfaces spanning along an entire cross-section of the body such that the body can conveniently be vertically and removably positioned over the generator while the generator remains statically seated on a ground surface. The body has an outer layer formed from foam material that extends along an entire surface area of the sidewalls. Such a body further has an inner layer that has an egg-crate shape directly and statically abutted to the outer layer. The inner layer is formed from fire-retardant material and has a thickness greater than a thickness of the outer layer. Such an inner layer is monolithically formed with the outer layer.

A lid is removably attached to the top surface of the body. Such a lid may be formed from rubber for advantageously preventing fluids from entering the body and further for conveniently muffling the sound waves emanating from the generator.

A water impermeable outer canvas is formed from flexible material such that the outer canvas can be gathered and stretched along the sidewalls. Such an outer canvas preferably includes a pair of linear edges vertically extending from the top open surface to the bottom open surface. The linear edges include hook and loop fasteners for effectively maintaining the outer canvas uniformly draped along an outer perimeter of the body during extended periods of time.

A mechanism is included for ventilating heat emitted by the generator housed within the body. Such a heat ventilating mechanism may include an electrically powered fan mounted to the lid. The fan is spaced from the sidewalls and is detachable from the body when the lid is removed from the sidewalls such that the user can conveniently and effectively access the cavity of the body. Such a fan is disposed at a highest elevation of the cavity for effectively expelling rising heat therefrom.

A plurality of elongated stakes are passed through the lid and the bottom surface of the body for advantageously and effectively anchoring the body to the ground surface. Such stakes are preferably coextensively shaped and have longitudinal lengths greater than a vertical height of the body. The stakes have top ends exposed above the lid such that the user can advantageously quickly extract the stakes without removing the lid from the body. A plurality of tie-down straps are directly connected to the stakes for conveniently and effectively assisting a user to remove the stakes from the body without disrupting the lid.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
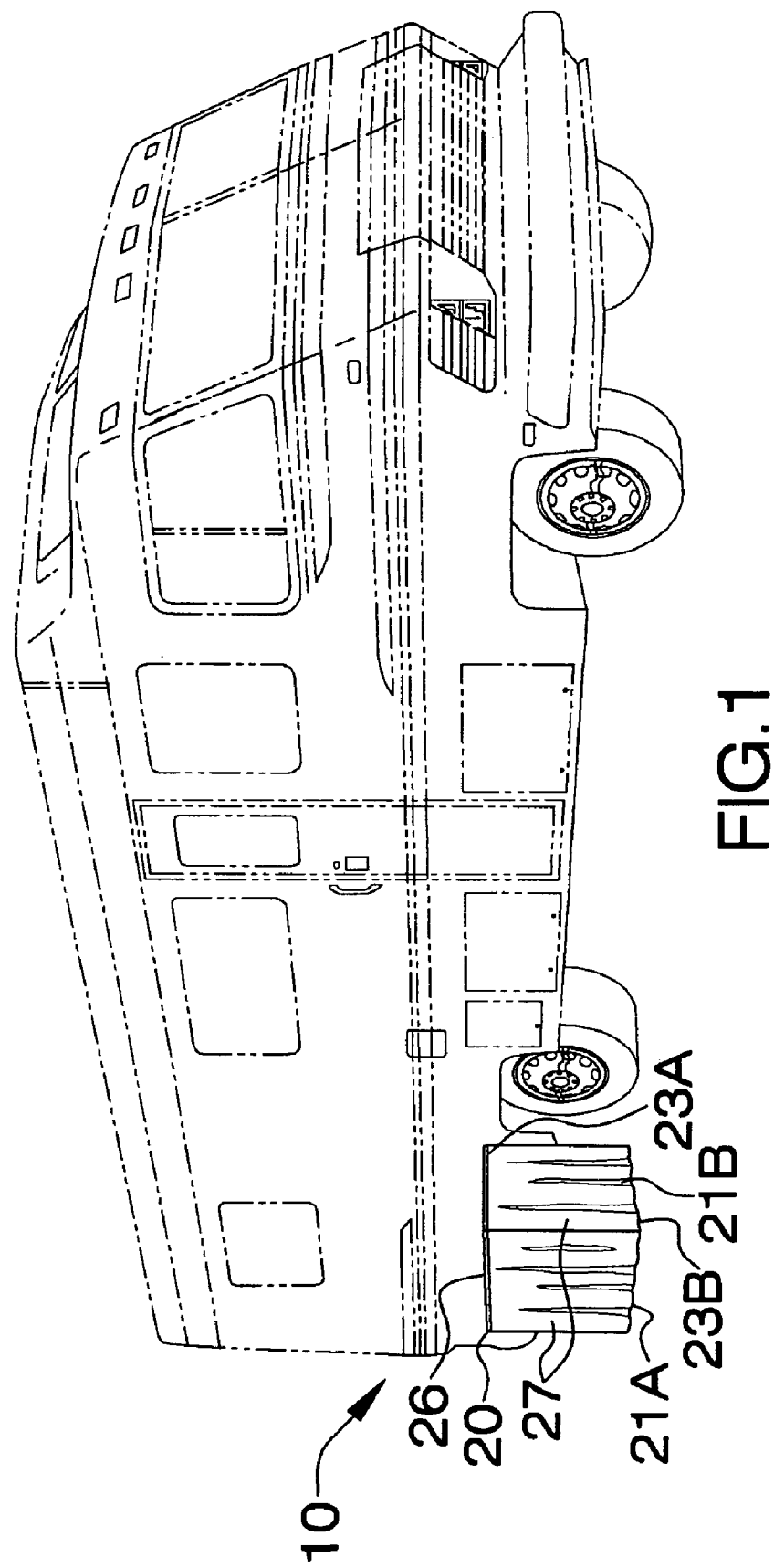
FIG. 1 is a perspective view showing a portable acoustic diffuser for portable generators, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-4 by the reference numeral 10 and is intended to provide a portable acoustic diffuser for portable generators. It should be understood that the assembly 10 may be used to cover many different types of noise generating devices and should not be limited in use to only portable generators.

Referring initially to FIGS. 1, 2, 3 and 4, the assembly 10 includes a body 20 that has monolithically formed first 21A, second 21B, third 21C and fourth 21D sidewalls defining a cavity 22 therebetween. Of course, the body 20 and it associated sidewalls may be produced in a variety of alternate sizes so as to accommodate larger or smaller noise generating devices, as is obvious to a person of ordinary skill in the art. Such a body 20 further has open top 23A and bottom 23B surfaces spanning along an entire cross-section of the body 20, which is essential such that the body 20 can conveniently be vertically and removably positioned over the generator while the generator remains statically seated on a ground surface.

Figure 3:
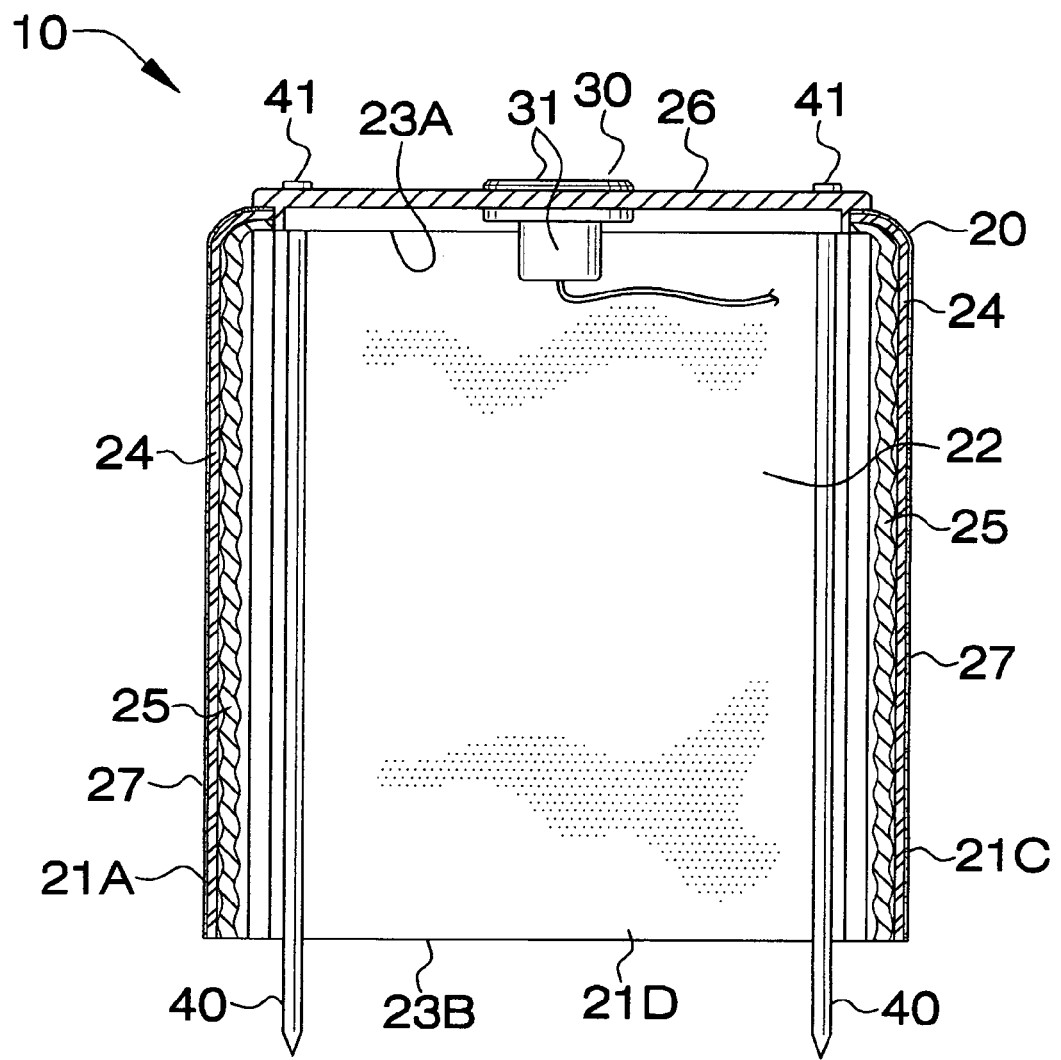
FIG. 3 is a cross-sectional view of the assembly shown in FIG. 2, taken along line 3-3.

The body 20 has an outer layer 24 formed from foam material that extends along an entire surface area of the sidewalls 21. Such a body further has an inner layer 25 that has an egg-crate shape that is directly and statically abutted, without the use of intervening elements, to the outer layer 24. The inner layer 25 is formed from fire-retardant material and has a thickness greater than a thickness of the outer layer 24, as is best shown in FIG. 3. Such an inner layer 25 is monolithically formed with the outer layer 24.

Again referring to FIGS. 1 through 4, a lid 26 is removably attached to the top surface 23A of the body 20. Such a lid 26 is formed from rubber, which is vital for advantageously preventing fluids from entering the body 20 and further for conveniently muffling the sound waves emanating from the generator. Of course, the lid 26 may be produced from any other suitable materials, like wood or aluminum, to name a few, or any combination thereof, as is obvious to a person of ordinary skill in the art.

Still referring to FIGS. 1 through 4, a water impermeable outer canvas 27 is formed from flexible material, which is critical and advantageous such that the outer canvas 27 can effectively be gathered and stretched along the sidewalls 21 for completely isolating the generator from adverse and inclement weather conditions. Such an outer canvas 27 includes a pair of linear edges 28 vertically extending from the top open surface 23A to the bottom open surface 23B. The linear edges 28 include hook and loop fasteners 29 that are essential and advantageous for effectively maintaining the outer canvas 27 uniformly draped along an outer perimeter of the body 20 during extended periods of time.

Figure 2:
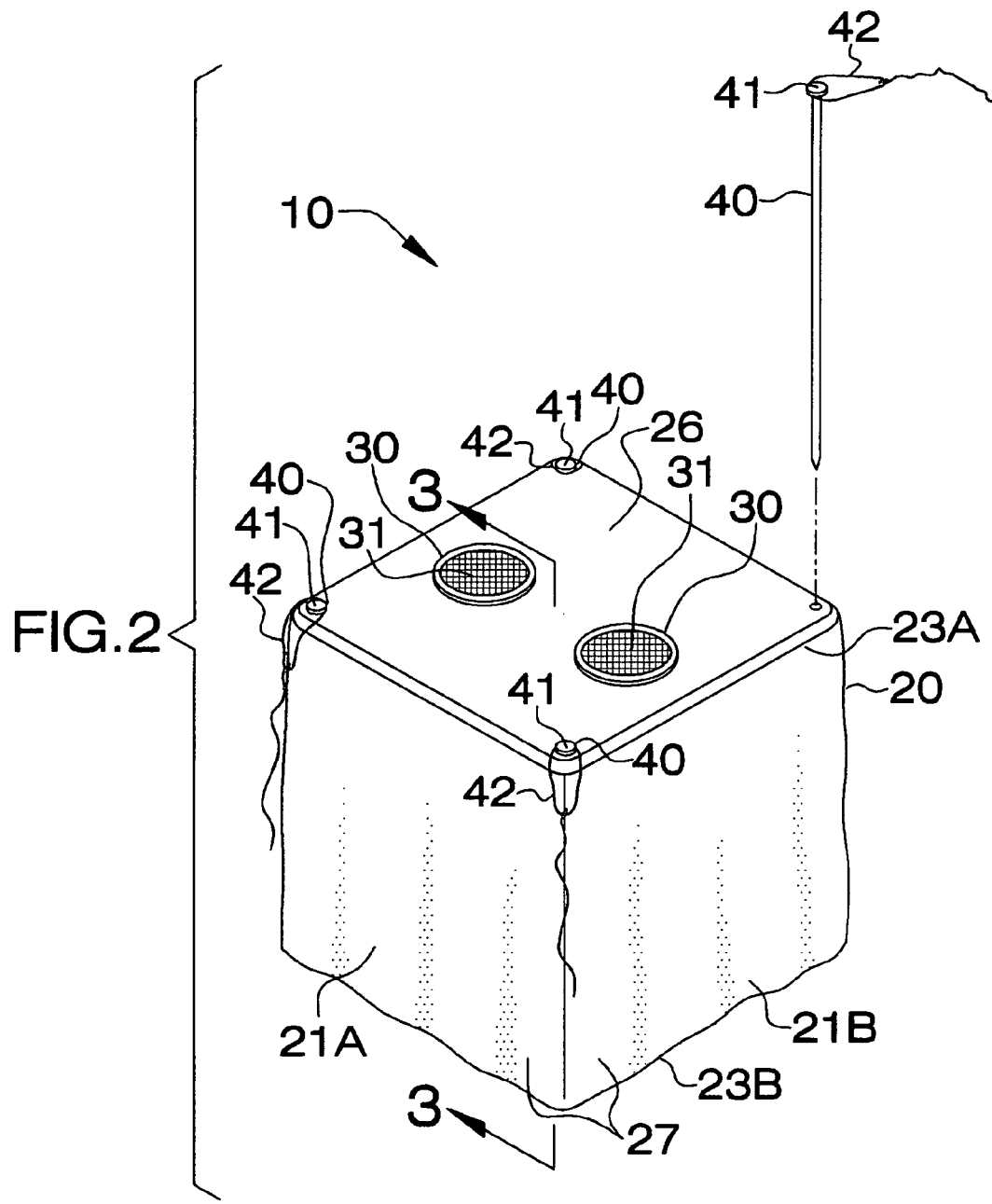
FIG. 2 is an enlarged perspective view of the portable acoustic diffuser assembly shown in FIG. 1, showing one stake removed therefrom.
Figure 4:
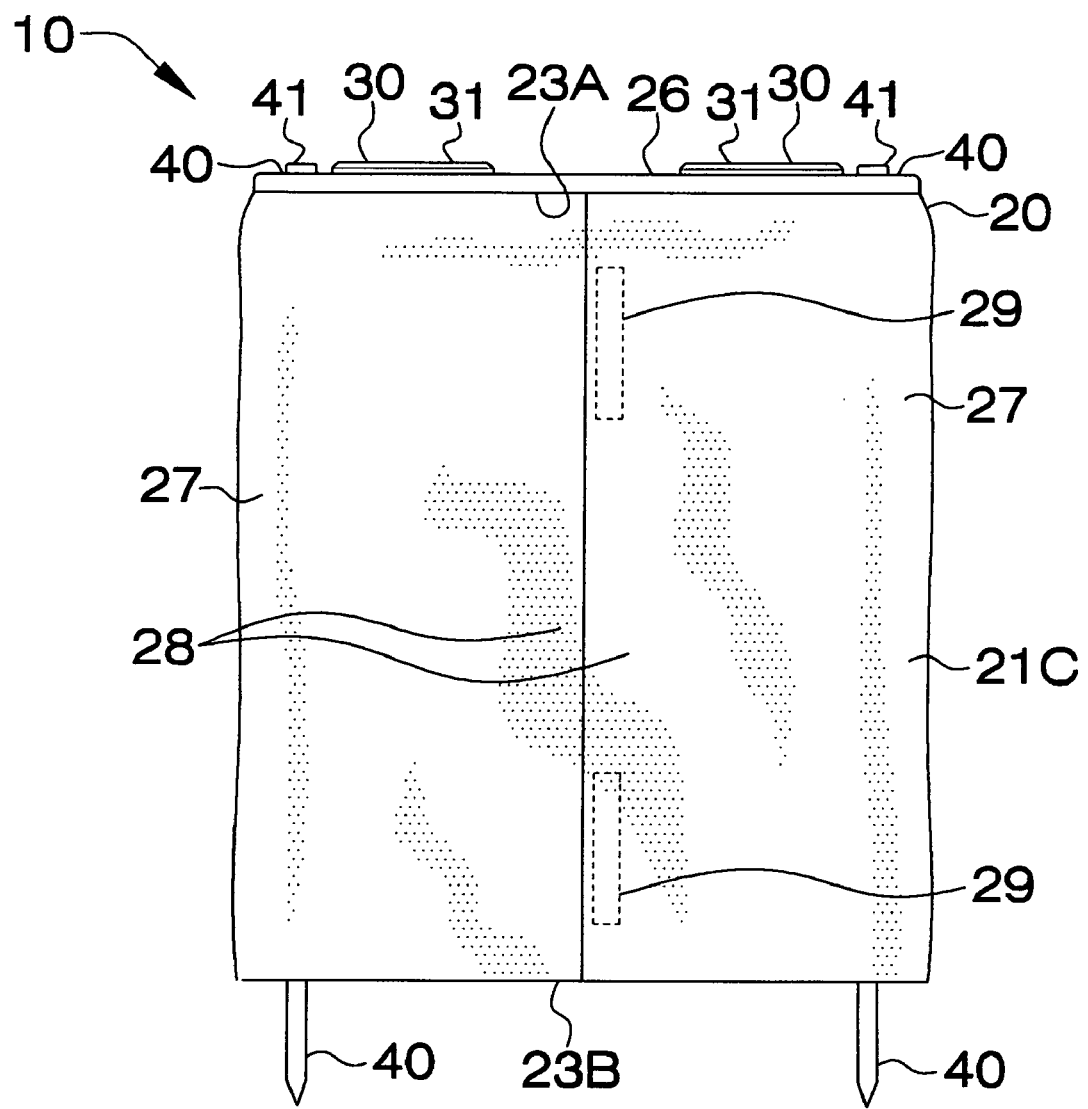
FIG. 4 is a side-elevational view of the assembly shown in FIG. 4, showing the linear edges of the outer canvas.

Referring to FIGS. 2, 3 and 4, a mechanism 30 is included for ventilating heat emitted by the generator housed within the body 20, which is vital for ensuring that such emitted heat does not accumulate and become a fire or health hazard. Such a heat ventilating mechanism 30 includes an electrically powered fan 31 mounted to the lid 26. The fan 31 is spaced from the sidewalls 21 and is detachable from the body 20 when the lid 26 is removed from the sidewalls 21, which is critical such that the user can conveniently and effectively access the cavity 22 of the body 20. Such a fan 31 is disposed at a highest elevation of the cavity 22, which is important for effectively expelling a maximum amount of rising heat therefrom.

Again referring to FIGS. 2, 3 and 4, a plurality of elongated stakes 40 are passed through the lid 26 and the bottom surface 23B of the body 20, which is essential for advantageously and effectively anchoring the body 20 to the ground surface. Such stakes 40 are coextensively shaped and have longitudinal lengths greater than a vertical height of the body 20, which is crucial for ensuring that the stakes 40 can effectively engage the ground surface for anchoring the body 20 after passing along an entire vertical height of the body 20. The stakes 40 have top ends 41 exposed above the lid 26, which is important such that the user can advantageously quickly extract the stakes 40 without removing the lid 26 from the body 20. A plurality of tie-down straps 42 are directly connected, without the use of intervening elements, to the stakes 40 that are vital for conveniently and effectively assisting a user to remove the stakes 40 from the body 20 without disrupting the lid 26.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable casing for muffling sound waves emulated by a portable generator employed during outdoor camping, said portable casing comprising:
    a body having monolithically formed first, second, third and fourth sidewalls defining a cavity therebetween, said body further having open top and bottom surfaces spanning along an entire cross-section of said body such that said body can be vertically and removably positioned over the generator while the generator remains statically seated on a ground surface, said body having an outer layer formed from foam material extending along an entire surface area of said sidewalls, said body further having an inner layer having an egg-crate shape directly and statically abutted to said outer layer, said inner layer being formed from fire-retardant material and having a thickness greater than a thickness of said outer layer;
    a lid removably attached to said top surface of said body;
    a water impermeable outer canvas formed from flexible material such that said outer canvas can be gathered and stretched along said sidewalls;
    means for ventilating heat emitted by the generator housed within said body; and
    a plurality of elongated stakes passed through said lid and said bottom surface of said body for anchoring said body to the ground surface.

2. The assembly of claim 1, wherein said lid is formed from rubber for preventing fluids from entering said body and further for muffling the sound waves emanating from the generator.

3. The assembly of claim 1, wherein said outer canvas comprises:
    a pair of linear edges vertically extending from said top open surface to said bottom open surface, said linear ends including hook and loop fasteners for maintaining said outer canvas uniformly draped along an outer perimeter of said body during extended periods of time.

4. The assembly of claim 1, wherein said heat ventilating means comprises:
    an electrically powered fan mounted to said lid, said fan being spaced from said sidewalls and detachable from said body when said lid is removed from said sidewalls such that the user can access the cavity of said body, said fan being disposed at a highest elevation of the cavity for expelling rising heat therefrom.

5. The assembly of claim 1, wherein said stakes are coextensively shaped and have longitudinal lengths greater than a vertical height of said body, said stakes having top ends exposed above said lid such that the user can quickly extract said stakes without removing said lid from said body.

6. A portable casing for muffling sound waves emulated by a portable generator employed during outdoor camping, said portable casing comprising:
    a body having monolithically formed first, second, third and fourth sidewalls defining a cavity therebetween, said body further having open top and bottom surfaces spanning along an entire cross-section of said body such that said body can be vertically and removably positioned over the generator while the generator remains statically seated on a ground surface, said body having an outer layer formed from foam material extending along an entire surface area of said sidewalls, said body further having an inner layer having an egg-crate shape directly and statically abutted to said outer layer, said inner layer being formed from fire-retardant material and having a thickness greater than a thickness of said outer layer;
    a lid removably attached to said top surface of said body;
    a water impermeable outer canvas formed from flexible material such that said outer canvas can be gathered and stretched along said sidewalls;
    means for ventilating heat emitted by the generator housed within said body;
    a plurality of elongated stakes passed through said lid and said bottom surface of said body for anchoring said body to the ground surface; and
    a plurality of tie-down straps directly connected to said stakes for assisting a user to remove said stakes from said body without disrupting said lid.

7. The assembly of claim 6, wherein said lid is formed from rubber for preventing fluids from entering said body and further for muffling the sound waves emanating from the generator.

8. The assembly of claim 6, wherein said outer canvas comprises:
    a pair of linear edges vertically extending from said top open surface to said bottom open surface, said linear ends including hook and loop fasteners for maintaining said outer canvas uniformly draped along an outer perimeter of said body during extended periods of time.

9. The assembly of claim 6, wherein said heat ventilating means comprises:
    an electrically powered fan mounted to said lid, said fan being spaced from said sidewalls and detachable from said body when said lid is removed from said sidewalls such that the user can access the cavity of said body, said fan being disposed at a highest elevation of the cavity for expelling rising heat therefrom.

10. The assembly of claim 6, wherein said stakes are coextensively shaped and have longitudinal lengths greater than a vertical height of said body, said stakes having top ends exposed above said lid such that the user can quickly extract said stakes without removing said lid from said body.

11. A portable casing for muffling sound waves emulated by a portable generator employed during outdoor camping, said portable casing comprising:
    a body having monolithically formed first, second, third and fourth sidewalls defining a cavity therebetween, said body further having open top and bottom surfaces spanning along an entire cross-section of said body such that said body can be vertically and removably positioned over the generator while the generator remains statically seated on a ground surface, said body having an outer layer formed from foam material extending along an entire surface area of said sidewalls, said body further having an inner layer having an egg-crate shape directly and statically abutted to said outer layer, said inner layer being formed from fire-retardant material and having a thickness greater than a thickness of said outer layer, wherein said inner layer is monolithically formed with said outer layer;

a lid removably attached to said top surface of said body;

a water impermeable outer canvas formed from flexible material such that said outer canvas can be gathered and stretched along said sidewalls;

means for ventilating heat emitted by the generator housed within said body;

a plurality of elongated stakes passed through said lid and said bottom surface of said body for anchoring said body to the ground surface; and a plurality of tie-down straps directly connected to said stakes for assisting a user to remove said stakes from said body without disrupting said lid.

12. The assembly of claim 11, wherein said lid is formed from rubber for preventing fluids from entering said body and further for muffling the sound waves emanating from the generator.

13. The assembly of claim 11, wherein said outer canvas comprises:

a pair of linear edges vertically extending from said top open surface to said bottom open surface, said linear ends including hook and loop fasteners for maintaining said outer canvas uniformly draped along an outer perimeter of said body during extended periods of time.

14. The assembly of claim 11, wherein said heat ventilating means comprises:

an electrically powered fan mounted to said lid, said fan being spaced from said sidewalls and detachable from said body when said lid is removed from said sidewalls such that the user can access the cavity of said body, said fan being disposed at a highest elevation of the cavity for expelling rising heat therefrom.

15. The assembly of claim 11, wherein said stakes are coextensively shaped and have longitudinal lengths greater than a vertical height of said body, said stakes having top ends exposed above said lid such that the user can quickly extract said stakes without removing said lid from said body.

* * * * *